US011250020B2

(12) United States Patent
Papanicolaou et al.

(10) Patent No.: US 11,250,020 B2
(45) Date of Patent: Feb. 15, 2022

(54) SYNCRONIZING CONTENT BLOCKS BETWEEN MULTIPLE ELECTRONIC DOCUMENTS

(71) Applicant: PRMA Consulting Limited, Fleet (GB)

(72) Inventors: Sotiria Papanicolaou, Fleet (GB); David Sykes, Fleet (GB); Rebecca Bradley, Fleet (GB)

(73) Assignee: PRMA Consulting Limited, Fleet (GB)

( * ) Notice: Subject to any disclaimer, the term of this patent is extended or adjusted under 35 U.S.C. 154(b) by 57 days.

(21) Appl. No.: 16/744,797

(22) Filed: Jan. 16, 2020

(65) Prior Publication Data
US 2020/0233879 A1    Jul. 23, 2020

(30) Foreign Application Priority Data
Jan. 22, 2019 (EP) .................................. 19153145

(51) Int. Cl.
*G06F 7/02* (2006.01)
*G06F 16/00* (2019.01)
(Continued)

(52) U.S. Cl.
CPC .............. *G06F 16/27* (2019.01); *G06F 16/93* (2019.01)

(58) Field of Classification Search
CPC ........... G06F 16/27; G06F 16/93; G06F 9/543
See application file for complete search history.

(56) References Cited

U.S. PATENT DOCUMENTS 8,701,084 B1* 4/2014 MacDonald .............. G06F 8/71
717/113
8,805,782 B2* 8/2014 Vasudevan ............. G06Q 10/10
707/625
(Continued)

OTHER PUBLICATIONS

Smith, Russell, "Office 35: Adding Content Controls to Word Documents," from https://petri.com/office-365-adding-content-controls-to-word-documents, May 6, 2016 (Year: 2016).*
(Continued)

*Primary Examiner* — Bruce M Moser
(74) *Attorney, Agent, or Firm* — Christopher M. Scherer; Erin Ella Block; DeWitt LLP

(57) ABSTRACT

Computer-implemented methods for synchronising content between documents are described. Content blocks within a source document are assigned respective unique identifiers, which content block unique identifiers are stored in source document metadata. When a content block is inserted into a destination document, the corresponding content block unique identifier is inserted into destination document metadata. An update to the content block in the source document is detected and, using the content block unique identifier, the corresponding content block in the destination document can be updated to reflect the changes made in the source document. The source document metadata and the destination document metadata thus serve to provide an underlying, intrinsic linkage at the content level between content blocks within the source document and content blocks within the destination document, which linkage enables changes in a particular content block within the source document to be detected and propagated to the corresponding content block in the destination document.

14 Claims, 8 Drawing Sheets

(51) Int. Cl.
  *G06F 16/27* (2019.01)
  *G06F 16/93* (2019.01)

(56) References Cited

U.S. PATENT DOCUMENTS

| | | | | |
|---|---|---|---|---|
| 10,545,988 B2 * | 1/2020 | Frye | ............... | G06F 16/93 |
| 2007/0133873 A1 * | 6/2007 | Aoyagi | ............ | G06K 9/00463 |
| | | | | 382/176 |
| 2009/0022975 A1 * | 1/2009 | Hales | ............... | B32B 19/06 |
| | | | | 428/311.11 |
| 2015/0370685 A1 * | 12/2015 | Heymann | ............ | G06F 11/3676 |
| | | | | 714/38.1 |
| 2016/0147651 A1 * | 5/2016 | Desai | ............. | G06F 11/1004 |
| | | | | 711/103 |
| 2017/0060570 A1 * | 3/2017 | Miller | ............... | G06F 8/71 |

OTHER PUBLICATIONS

Souithpaw Hare, question/answer on storing clipboard information, Feb. 21, 2014, from https://stackoverflow.com/questions/21940399/custom-clipboard-data (Year: 2014).*

* cited by examiner

470: Initiate, by the processor, a scan of a source document to identify one or more content blocks for copying to a database

475: Copy, by the processor, the content of each content block identified in step 470 to a content database that is external from the source document

SYNCRONIZING CONTENT BLOCKS BETWEEN MULTIPLE ELECTRONIC DOCUMENTS

CROSS-REFERENCE TO RELATED APPLICATIONS

The present application claims priority to European Patent Application No. 19153145.8, filed Jan. 22, 2019, the content of which is incorporated herein by reference in its entirety.

FIELD OF INVENTION

This invention relates generally to synchronisation of content across multiple electronic documents. This invention relates more specifically to synchronisation of a subset of the total content contained in a given electronic document with at least one other electronic document.

BACKGROUND

It is often desirable to insert content from a source electronic document into a destination electronic document. Often this is done using a 'copy and paste' type operation, where content from the source document is copied from the source document and inserted into the destination document. This operation can be performed directly by the user, e.g. by using the system clipboard, or the copy operation may be performed using application-specific functionality such as an 'insert document' operation.

A problem with this copy and paste type operation is that there is no persistent link between the copy of content in the source document and the copy of the content in the destination document. If the content in the source document is subsequently edited, it is necessary to repeat the copy and paste operation to have these edits reflected in the destination document. This can be particularly problematic in a multi-user environment where a given user may not be aware that particular content in a source document has been updated by another user.

Additionally, a particular user may not even be aware that a given block of content was originally copied from a source document, in which case said user would not have any reason for even seeking out the source document, let alone checking whether the content has been edited in the source document.

It is known to synchronise multiple instances of a particular file between different repositories. This involves copying the file from one repository to another on a periodic or ad-hoc basis. This synchronisation is suitable where it is appropriate to update the entire content of a file, but is not suited for use in the case where it is only a subset of the content of the file that should be updated. This type of synchronisation operation is also not suitable for use in the case where a destination document contains content from multiple different source documents.

In a similar approach, it is also known to include a link to a source document in a destination document. The link enables the content of the source document to be reproduced in the destination document. The link can be manually refreshed within the destination document to re-acquire the content from the source document on an ad-hoc basis. As with the synchronisation techniques discussed above, this approach is only suitable for use in cases where the entire content of the source document is to be included in the destination document. It is not possible to include only a subset of the source document content in the destination document using this technique.

In the context of web pages, it is known to use nesting techniques to embed a first HTML document within a second HTML document. For example, the 'iframe' HTML tag creates an inline frame that supports this embedded structure. This technique suffers from the same problem as the linking technique discussed in the immediately preceding paragraph, in that it is not possible to embed only part of the content of an HTML document. Moreover, each inline frame is a complete document environment, increasing the computational resources required to process and display the resulting web page.

It is also known to provide a hyperlink to enable a user to access the content of a second document from a first document. While this ensures that the content is kept up to date, the user is required to follow the hyperlink to review the content. This is inconvenient for the user as they must wait for the second document to be loaded before being able to review the content. Hyperlinks also point to an entire document and so again are not suitable for including only a subset of a source document in a destination document.

Thus, a need exists for a technique that is capable of retaining an association between the same content in a source document and destination document, where this content is a subset of the total content of the source document, and where the technique enables a user to easily view the content in the destination document. Preferably, this technique should enable a single destination document to include sub-content from multiple different source documents. Preferably, this technique should function effectively in a multi-user environment.

SUMMARY OF THE INVENTION

In a first aspect the invention provides a computer-implemented method for updating a destination content block associated with a destination document based on a source content block associated with a source document, the source content block being one of a plurality of content blocks associated with the source document, the source document having associated source document metadata and the destination document having associated destination document metadata, the destination document metadata including at least a content block unique identifier associated with the destination content block and a destination content block version identifier associated with the destination content block, the method comprising:

a) receiving, by the processor, the content block unique identifier and the destination content block version identifier;

b) searching, by the processor, the source document metadata for the received content block unique identifier;

c) in the event the content block unique identifier is found in the source document metadata, comparing, by the processor, the destination content version identifier to a source content block version identifier that is associated with the content block unique identifier in the source document metadata; and d) in the event the comparing indicates that the source document version identifier is more recent than the destination document version identifier, performing, by the processor, a further action comprising:

outputting, to a graphical user interface displayed on a display that is communicatively coupled to the processor, an indication that a newer version of the destination content block is available; receiving user input indicating that an update operation is to be performed; and, responsive to the user input, performing the update operation by overwriting the destination content block with the source content block; or performing an update operation by overwriting the destination content block with the source content block.

In a second aspect the invention provides a data processing device configured to carry out the method of the first aspect.

In a third aspect the invention provides a non-transitory computer-readable storage medium having instructions stored thereon that, when executed by a processor, cause the processor to perform the method of the first aspect.

Further preferred features of the invention are set out in the appended dependent claims.

BRIEF DESCRIPTION OF THE DRAWINGS

Embodiments of the present invention are described below, by way of example only, with reference to the accompanying drawings, in which.

DETAILED DESCRIPTION OF EMBODIMENTS

Figure 1:
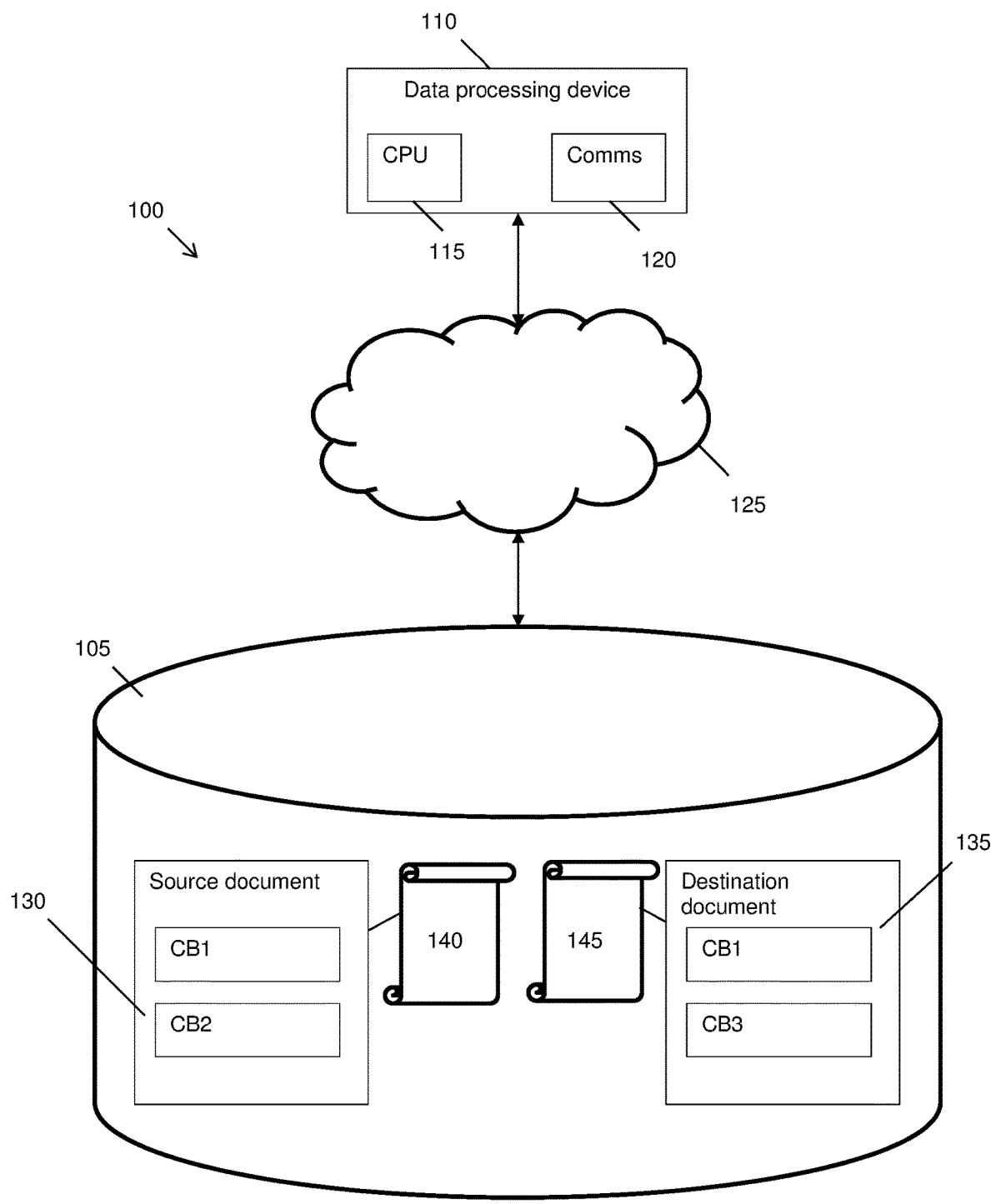
FIG. 1 shows a schematic view of a system suitable for implementing the invention.

Before describing the invention in detail, a number of definitions are provided to aid in the understanding of the terminology used throughout this specification.

As used herein, the term 'document' is understood to mean an electronic document. An electronic document may also be referred to as a 'file' in the art.

An electronic document is understood to have content associated with it, which content may be referred to as being 'stored' within the document. Examples of documents include but are not limited to: Microsoft® Office™ documents (e.g. .doc, .docx, .xls, .xlxs), OpenOffice™ documents created with the Apache OpenOffice™ suite (e.g. .ods), etc.

A 'content block' is understood to refer to a subset of the total content of a given electronic document. Thus, in the exemplary case of a text document associated with a word processing application, a content block can refer to a particular paragraph or set of paragraphs within the text document, or a particular image or set of images contained within the document, or a combination of a particular paragraph or set of paragraphs with a particular image or set of images. This list is non-exhaustive and other types of content such as audio and/or video files are also within the scope of the term 'content block'.

A 'source document' is understood to refer to an electronic document containing the primary or 'master' copy of a particular content block. A 'destination document' is understood to refer to an electronic document containing the secondary or 'slave' copy of a particular content block. It should thus be understood that changes that are made to the particular content block in the source document should be propagated to the content block in the destination document, but that the reverse is not true. It will be appreciated that a particular document can be the source document for a first content block, and the destination document for a second, different, content block.

'Metadata' takes its usual meaning in the art, namely a set of data that describes and given information about other data. 'Source document metadata' is understood to be metadata that is associated with a source document such that it describes and gives information about the content blocks that are stored in the source document. Similarly, 'destination document metadata' is understood to be metadata that is associated with a destination document such that it describes and gives information about the content blocks that are stored in the destination document. Document metadata may itself be stored within its associated document, or it may be stored separately from its associated document in a separate file.

A 'data processing device' is understood in the context of this specification to mean any device capable of processing an electronic document, document metadata and/or accessing a content database as defined herein. Here, 'processing' indicates that the data processing device performs one or more operations. In the case of a document, the operations may include but are not limited to any combination of: opening the document, editing the document, saving the document, transmitting the document over a network connection, etc. Equivalent operations in respect of document metadata are contemplated. Operations regarding the content database include: querying the content database, extracting data from the content database, committing data to the content database, and the like. The operations described above are not an exhaustive list and other operations will be apparent to a skilled person having the benefit of the present disclosure.

A data processing device includes one or more processors, and may also include any combination of: a non-volatile memory unit, a volatile memory unit, a human interface device, a display, a network adapter capable of wired and/or wireless communication over a network, a cellular radio capable of wireless communication over a telecommunications network, and the like.

Specific examples of data processing devices suitable for putting one or more aspects of the invention described herein into effect include but are not limited to: a desktop computer, a laptop computer, a smartphone, a server, and a tablet.

'The Cloud', or equivalently 'Cloud-based', is understood to refer to one or more configurable computing resources that can be called upon to perform tasks according to need. The computing resources are located remotely from a user or a data processing device associated with the user and are accessible over a network such as the internet or a cellular network.

The following description sets out computer-implemented methods for performing one or more aspects of the invention. It will be appreciated that any such methods can be performed by one or more data processing devices executing instructions that are stored on one or more non-transitory computer-readable media, wherein said instructions cause one or more processors of the one or more data processing devices to carry out said methods.

Where steps of a method are shown in a specific sequence, it is understood that this sequence is exemplary rather than limiting unless explicitly stated otherwise. Thus, the ordering of steps can be altered from that described and shown in the figures, where altering includes performing one or more steps substantially concurrently.

FIG. 1 shows a system 100 suitable for implementing at least one of the computer implemented methods described herein. System 100 includes a document storage medium 105 which in the illustrated embodiment is a database stored in the Cloud.

A data processing device 110 is present in system 100, comprising a processor 115 and a communications module 120. Communications module 120 enables data processing device 110 to communicate with document storage medium 105. In the illustrated embodiment data processing device 110 is a desktop computer and communications module 120 is a network adapter capable of communicating with document storage medium 105 over the internet 125.

It will be appreciated that the arrangement of components shown in FIG. 1 is purely exemplary, and numerous modifications may be made without departing from the scope of the invention. For example, data processing device 115 could alternatively be a server, a tablet, a smartphone, a laptop computer, a distributed set of data processors, a hypervisor hosting a virtual machine, etc. Communications module 120 could be a cellular radio and internet 125 could be replaced by a cellular network. Document storage medium 105 could be replaced with a set of different storage media, with the source document being stored on one of the set of storage media and the destination document being stored on another of the set of storage media. In such cases, the distributed storage media may be collectively referred to as a document storage medium for the purposes of this disclosure. Document storage medium 105 could alternatively be local to data processing device 110, e.g. a hard drive or solid state drive of data processing device 110, in which case the communications module 120 would not be required.

Whatever the configuration of system 100, document storage medium 105 includes source document 130 and destination document 135. Source document 130 includes a plurality of content blocks and destination document 135 includes at least one content block. In the illustrated embodiment source document 130 includes a first content block CB1 and a second content block CB2. Destination document 135 includes the first content block CB1 and also a third content block CB3.

The following discussion focusses on first content block CB1. It is understood that source document 130 holds the primary copy of content block CB1, hence this document is given the designation 'source' in respect of content block CB1. The copy of content block CB1 that is present in destination document 135 is a secondary copy of content block CB1, hence this document is given the designation 'destination' in respect of content block CB1. It is understood that edits to the copy of content block CB1 held within source document 130 should be propagated to the copy of content block CB1 held in destination document 135, but that the reverse is not true. More than one secondary copy of a content block may exist simultaneously, within each of a plurality of destination documents or as multiple instances of the content block within a single destination document.

Also present in system 100 is source document metadata 140. Source document metadata 140 is associated with source document 130. Here, 'associated with' indicates that source document metadata 140 contains information about the content of source document 140. Similarly, destination document 135 has associated with it destination document metadata 145.

In the illustrated embodiment, source document metadata 140 and destination document metadata 145 are stored in respective files that are each separate from their respective documents. A suitable file format for storing metadata is, for example, the extensible markup language (.xml) format as known per se in the art. It is however contemplated that other file formats can be used to store the metadata, and further contemplated that the source document metadata may be integrated within the source document and/or the destination document metadata may be integrated within the destination document.

Source document metadata 140 and destination document metadata 145 are shown as being stored within storage medium 105. This is not essential, and in the case that storage medium 105 is a distributed storage medium either metadata file may be stored in a different physical and/or logical location to the other and/or a different physical and/or logical location to its respective source document.

Source document metadata 140 includes at least a content block unique identifier and a content version identifier for each content block stored within source document 130. Preferably, these identifiers are stored in a string having base64-encoded JSON format as is known per se in the art. The invention is however not limited in this manner and any suitable format for storing these identifiers can alternatively be used.

The content block unique identifier is a unique identifier that identifies a given content block within system 100. Thus, in the case of source document metadata 140, two content block unique identifiers are present: a content block unique identifier for CB1 and a content block unique identifier for CB2. Here, 'uniquely identifies' should be understood to mean that no two different content blocks within storage medium 105 have the same unique identifier. The unique identifier may thus be synonymously referred to as a 'Globally Unique Identifier' (GUID) or 'Universally Unique Identifier' (UUID). Techniques for generating GUIDs or UUIDs are known in the art, for example generating a value based on a current system time.

It should be appreciated that it is not necessary to ensure that content block identifiers are unique across multiple instances of system 100, only that they are unique within a given instance of system 100. Thus, a second instance of system 100 that includes another storage medium logically and/or physically separated from storage medium 105 does not need to have identifiers that are unique with respect to the instance of system 100 shown in FIG. 1. This is because this second instance of system 100 would not interact with system 100 in any way relevant to the invention.

It is important to appreciate that multiple copies of a particular content block within system 100 each have the same unique identifier. Thus, the unique identifier associated with the copy of content block CB1 present in destination document metadata 145 is the same as the unique identifier associated with the copy of content block CB1 present in source document metadata 140.

The content version identifier is a value that indicates a version of the content block. Techniques for versioning of documents per se are known and any such known technique can be applied to versioning of content blocks. It will be understood that a newly created content block receives an initial version identifier, for example 1.0, and over time as edits are made to the content block the version identifier is correspondingly updated, for example with 2.0 indicating that one round of editing has been made. Whatever the scheme used for versioning, it is understood that the scheme will enable two instances of a given content block to be compared such that it is can be determined which instance is the more recent instance.

Tables 1 and 2 show, in a simplified form, the information contained in source document metadata 140 (Table 1) and destination document metadata 145 (Table 2). It will be appreciated that these tables are representations of the information stored in the metadata provided for understanding of the invention and that a practical implementation of the invention may make use of metadata that diverges significantly from the format of Tables 1 and 2.

TABLE 1

| Metadata 140 | |
| --- | --- |
| Unique ID | Version |
| CB1 | 2.0 |
| CB2 | 1.0 |

TABLE 2

| Metadata 145 | |
| --- | --- |
| Unique ID | Version |
| CB1 | 1.0 |
| CB3 | 2.0 |

Optionally, each content block can be associated with a container within the document in which it is contained. A suitable example of a container within the context of the Microsoft® Office™ environment is a content control, as known per se in the art. Another example of a container, again in the context of the Microsoft® Office™ environment, is a comment, where the extents of the commented region acts as delimiters for the content block. Comments are also known per se and thus are not described in detail here. More than one type of container may be used in a single document, if desired.

Each container has an associated container unique identifier, which can be a GUID or UUID as described above. The container acts as a delimiter for the content block within the document in which the content block is stored, indicating the extent of the content block within the total content of the host document. More information regarding containers is provided later in this specification in connection with FIG. 4A.

A preferred container configuration in the context of the Microsoft® Office™ environment makes use of content controls as containers for destination content blocks and comments as containers for source content blocks. This implementation is most preferably combined with creation of a 'snapshot' of each source content block that is captured and stored external to the document itself in a content database, as discussed later in this specification in connection with FIG. 4B.

In the case that one or more containers are present, the information contained in source document metadata 140 and destination document metadata 145 may also include the container unique identifier. Tables 3 and 4 show, in a simplified form, the information that may be contained in source document metadata 140 (Table 3) and destination document metadata 145 (Table 4) when using containers in the form of content controls and/or comments. It will be appreciated that these tables are representations of the information stored in the metadata provided for understanding of the invention and that a practical implementation of the invention may make use of metadata that diverges significantly from the format of Tables 3 and 4.

It should be noted that the container unique identifier is independent of the content block unique identifier in the sense that two different containers associated with the same content block will nevertheless have different container unique identifiers.

TABLE 3

| Metadata 140 | | |
| --- | --- | --- |
| Content Block Unique ID | Container Unique ID | Version |
| CB1 | C1 | 2.0 |
| CB2 | C2 | 1.0 |

TABLE 4

| Metadata 145 | | |
| --- | --- | --- |
| Content Block Unique ID | Container Unique ID | Version |
| CB1 | C3 | 2.0 |
| CB3 | C4 | 1.0 |

In the interests of clarity and ease of understanding, only two documents have been described and shown in FIG. 1. However, it will be appreciated that any number of documents can be stored within storage medium 105. Each document can contain one or more content blocks, and a given content block can be associated with any number of documents. A document designated as a source document for a given content block may be designated as a destination document for a different content block. It is also contemplated that a destination document designation may be changed to a source document designation for a given content block, and vice versa, if desired, with the effect being that the direction of updating of a content block is reversed.

Data processing device 110 may include, or be communicatively coupled to, other components including but not limited to a display (not shown) suitable for rending a graphical user interface (GUI) that assists a user in the inputting of commands to system 100, via a human interface device (not shown), and receive information from system 100. The human interface device may be any known device including any combination of a mouse, a keyboard and a touchscreen.

Figure 2:
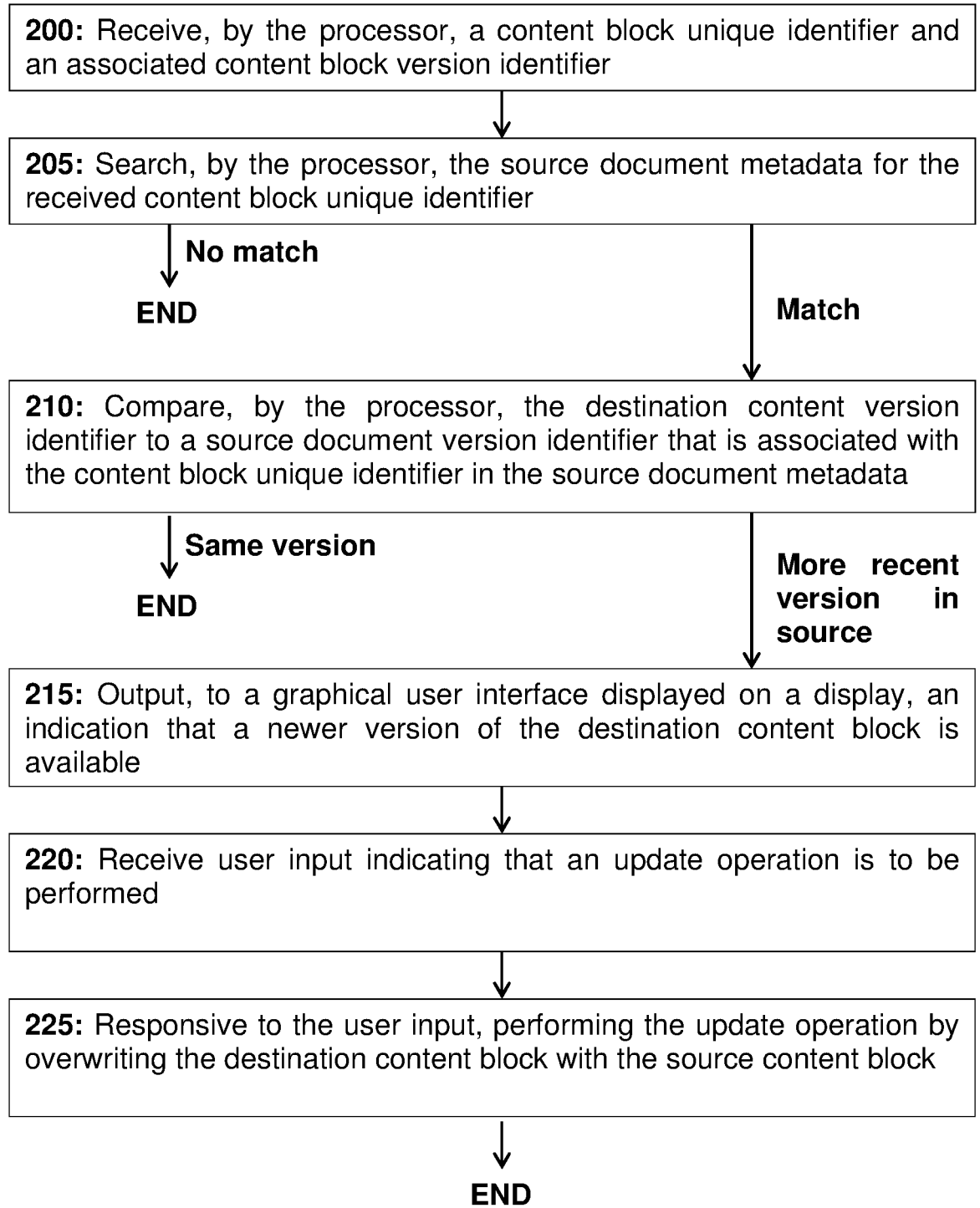
FIG. 2 shows a process for updating a destination content block associated with a destination document based on a source content block associated with a source document, according to a first embodiment.

FIG. 2 shows a flow diagram illustrating a process for updating a destination content block based on a source content block according to a first embodiment. This process can be carried out by processor 115 in the context of system 100.

In step 200, processor 115 receives a content block unique identifier such as unique identifier 'CB1' (Table 2) and an associated destination content block version identifier, such as '1.0' (Table 2). The content block unique identifier and the destination content block version identifier may be transmitted to the processor in response to an action that indicates that it is desirable to check for updated content blocks. This action could be, for example, saving of source document 130. Alternatively or additionally, the action could be the overwriting of source document 130 in storage medium 105, or the creation of a new version of source document 130 in storage medium 105, e.g. as a result of an upload operation. As a further alternative, the action could be the triggering of a refresh or update operation, perhaps by the user interacting with a refresh button provided within a GUI displaying destination document 135.

In step 205, processor 115 searches source document metadata 140 for the received content block unique identifier. The searching may involve comparing each of the content block unique identifiers contained in source document metadata 140 with the received content block unique identifier to see if a match can be found. A match is understood to mean an exact match, where the received content block unique identifier is identical to a content block unique identifier contained in source document metadata 140.

In the event that no match is found, the process ends as shown in FIG. 2. Alternatively, it is possible that a set containing multiple content block unique identifiers was received in step 200; in that case, the process may repeat step 205 with a different content block unique identifier from the set.

As a further alternative, the process may repeat step 205 with the same content block unique identifier but searching metadata associated with a different document which has the potential to be a source document. In this case, where a set of content block unique identifiers is received in step 200, only once all potential source documents have been exhausted will the process move on to a next content block unique identifier.

In the event a match is found in step 205, the process moves on to step 210 in which processor 115 compares the destination content version identifier to a source document version identifier that is associated with the content block unique identifier in the source document metadata. In the example of Tables 1 and 2, this step involves comparing the version identifier 1.0 stored in the destination document metadata 145 to the version identifier 2.0 stored in the source document metadata 140 in association with the content block unique identifier CB1.

In the event that the destination content block version identifier is the same as the source content block version identifier, the process ends as the destination content block is fully up to date. Alternatively, it is possible that a set containing multiple content block unique identifiers was received in step 200; in that case, the process may at this point repeat step 205 with a different content block unique identifier from the set.

In the event that the destination content block version identifier indicates that the source content block is more recent than the destination content block, it is desirable to carry out an update because a more recent version of the content block is present in the source document. In this case the process proceeds to step 215.

Following step 210, processor 115 performs a further action. In the embodiment of FIG. 2, the further action comprises the following steps.

In step 215, the processor 115 outputs, to a graphical user interface displayed on a display, an indication that a newer version of the destination content block is available. The graphical user interface can take any format and a suitable format will be selected by the skilled person according to the specifics of a given situation.

One exemplary format for the graphical user interface is a user form including an indication of the destination content block, where the indication has an associated user form control such as a button that enables the user to indicate that they wish to proceed with the updating of the destination content block. The indication preferably enables the user to easily identify the destination content block that is to be updated. The indication can be any one or more of the following: a copy of the destination content block, a copy of the source content block, a marked up version of the destination content block indicating the changes that will be made based on a comparison between the destination content block and the source content block, a summary of the source content block such as a title, first line or first sentence of the source content block, a summary of the destination content block such as a title, first line or first sentence of the destination content block, a copy of part or all of an image forming part of the source content block or the destination content block, and the like.

In the case where a set containing multiple content block unique identifiers was received in step 200, it is contemplated that steps 205 and 210 are repeated for each content block unique identifier of the set. In this case, step 215 is modified to output a separate indication for each destination content block from the set for which it was determined that a more recent version exists in the source document. Thus, multiple indications may be present simultaneously on the graphical user interface, with the user having the ability to indicate on an indication-by-indication basis the content block(s) that are to be updated.

In step 220, processor 115 receives user input indicating that an update operation is to be performed. The user input can be received via a human interface device that is communicatively coupled to processor 115. In the exemplary format for the graphical user interface described above, the user input can take the form of the user clicking the button with an on-screen mouse cursor, or the user interacting with a touch-sensitive region of the display associated with the button. The invention is not limited in this respect and any form of user input is within the scope of the invention.

In step 225, responsive to the user input received in step 220, processor 115 performs the update operation by overwriting the destination content block with the source content block. Optionally, processor 115 also amends the destination document metadata to set the destination content version identifier equal to the source content version identifier. As part of the update operation, the content of the source content block may be extracted directly from source document 130, or it may be extracted from a content database as described below in connection with FIG. 4B.

Following step 225, the process ends as the destination content block in the destination document is now identical to the source content block in the source document. Alternatively, it is possible that a set containing multiple content block unique identifiers was received in step 200; in that case, the process may at this point repeat step 205 with a different content block unique identifier from the set.

Optionally, following step 225, processor 115 may create a log indicating the content block(s) that have been updated. The log may be stored within destination document metadata 145 or separately in its own log file. The log may include content block unique identifiers corresponding to each destination content block that was updated. The log may include a timestamp indicating when each content block was updated. The log may include one or more user identifiers indicating a user or users that authorised the update operation(s).

Figure 3:
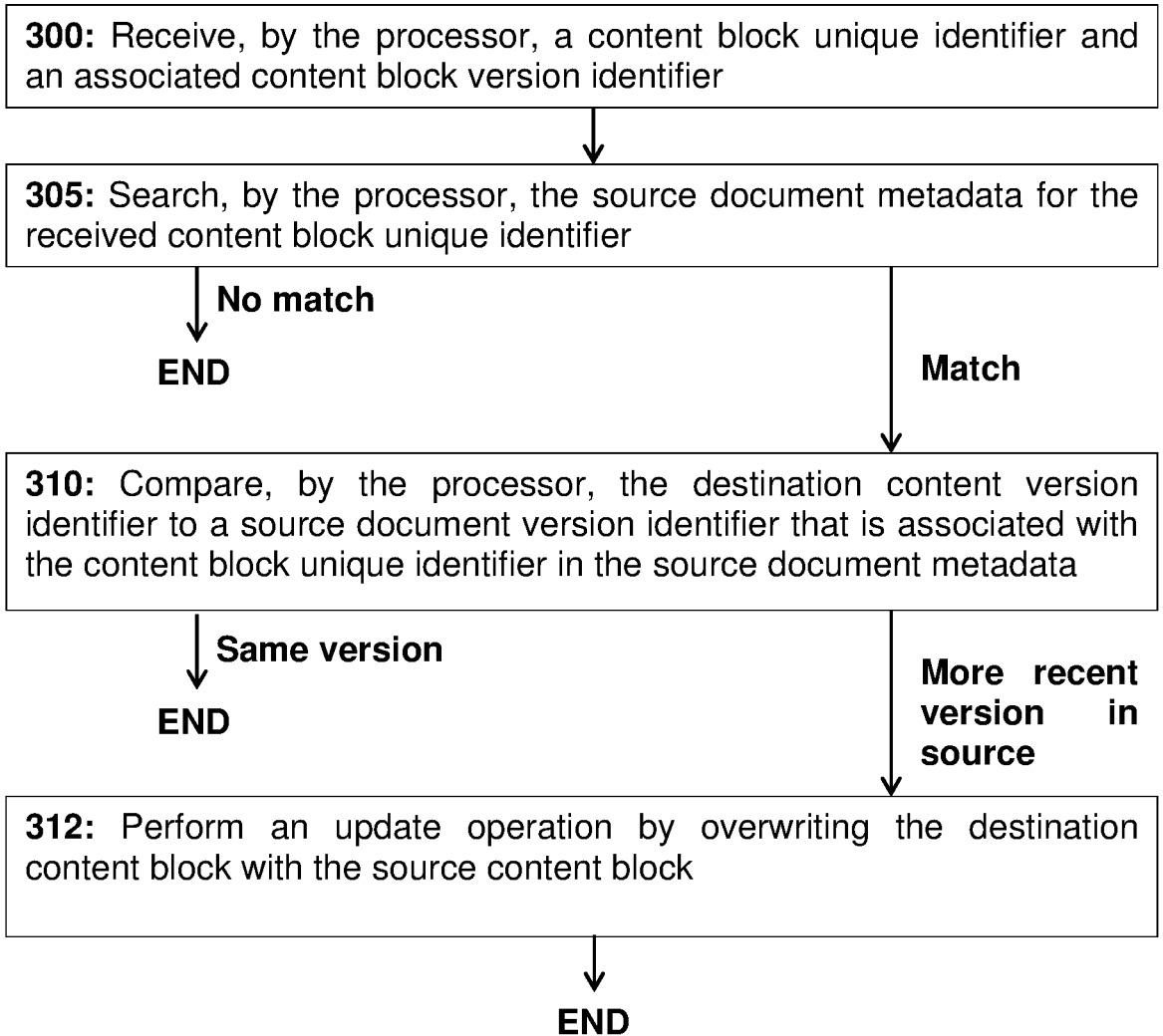
FIG. 3 shows an alternative process for updating a destination content block associated with a destination document based on a source content block associated with a source document, according to a second embodiment.

FIG. 3 shows a flow diagram illustrating a process for updating a destination content block based on a source content block according to the second embodiment. This process can be carried out by processor 115 in the context of system 100.

The process of FIG. 3 is identical to the process of FIG. 2 for the main part, and differs only in the further action performed by the processor. Specifically, steps 300, 305 and 310 are identical to steps 200, 205 and 210, respectively. For this reason, and in the interests of brevity, steps 300, 305 and 310 are not described in further detail here.

Following step 310, processor 115 performs a further action. In the embodiment of FIG. 3, the further action comprises the following step.

In step 312, following detection of a more recent version of the content block in the source document, processor 115 performs the update operation by overwriting the destination content block with the source content block. Optionally, processor 115 also amends the destination document metadata to set the destination content version identifier equal to the source content version identifier.

Following step 312, the process ends as the destination content block in the destination document is now identical to the source content block in the source document. Alternatively, it is possible that a set containing multiple content block unique identifiers was received in step 300; in that case, the process may at this point repeat step 305 with a different content block unique identifier from the set.

Optionally, following step 312 processor 115 may create a log indicating the content block(s) that have been updated. The log may be stored within destination document metadata 145 or separately in its own log file. The log may include content block unique identifiers corresponding to each destination content block that was updated. The log may include a timestamp indicating when each content block was updated. The log may include one or more user identifiers indicating a user or users that were logged on to the system during the update operation.

Figure 4:
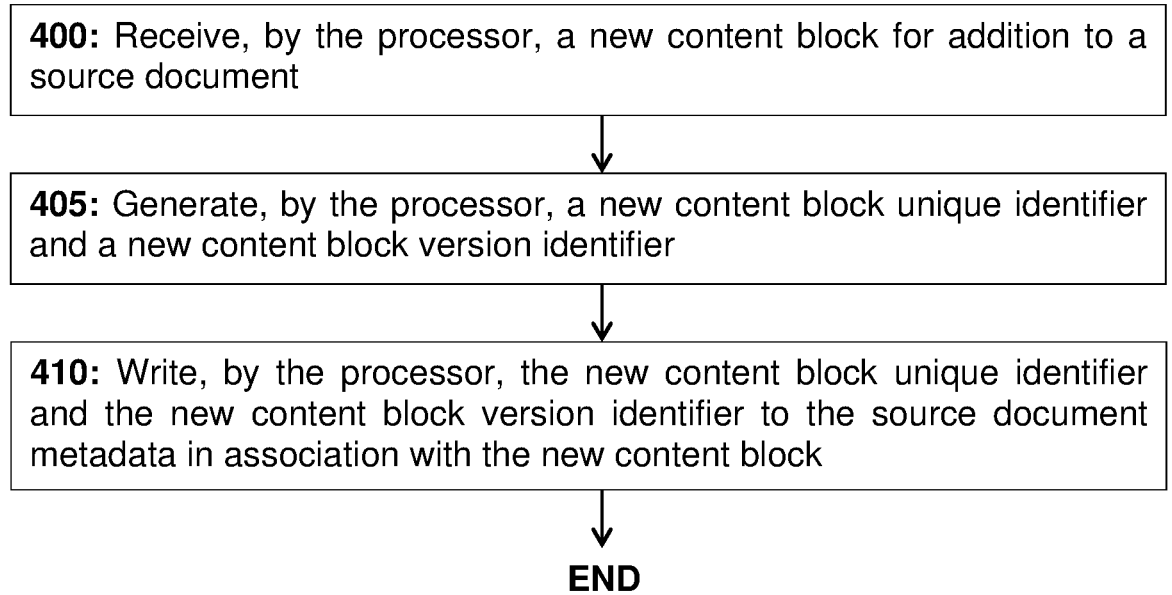
FIG. 4 shows a process for adding a new content block to a source document according to a third embodiment, which process is suitable for use in combination with the either the process of FIG. 2 or the process of FIG. 3.

FIG. 4 shows a process for adding a new content block to a source document according to the third embodiment. The process of FIG. 4 enables a new content block to be registered as a source content block in the context of an instance of system 100, making it available for insertion into one or more destination documents in the manner discussed later in connection with FIG. 5. System 100 of FIG. 1 is capable of implementing the process of FIG. 4.

In step 400, processor 115 receives a new content block for addition to a source document such as source document 130. The new content block is identified in a manner that delimits it against existing content in the source document. This may be, for example, a page number within the source document, a paragraph number and/or line number within the source document, a location of the new content block relative to a reference point in the source document such as a page margin or page corner, and the like.

Optionally, the new content block may be associated with a container within the source document in the manner described in this specification. In this case, the container serves as a delimiter for the new content block.

The significance of the delimiter is that it serves to distinguish between the addition of a new content block to the source document and the editing of an existing content block within the source document. Specifically, amendment within an existing delimiter is treated as editing of an existing content block, and editing outside of any existing delimiter is treated as addition of a new content block.

A new content block may be received by processor 115 following an operation including but not limited to: saving the source document, editing the source document, detection of a paste operation having the source document as a target, insertion of a new container into the source document, and the like.

In step 405, processor 115 generates a new content block unique identifier and a new content block version identifier. The new content block unique identifier and the new content block version identifier are of the type discussed earlier in this specification. The new content block version identifier should be set to a value that indicates that the new content block is the first instance of the new content, e.g. '1.0'.

In step 410, processor 115 writes the new content block unique identifier and the new content block version identifier to the source document metadata in association with the new content block. Continuing with the simplified example of Table 1 discussed earlier, this would involve adding the information shown in the bottom row of Table 5 below to metadata 140.

TABLE 5

| Metadata 140 | |
| --- | --- |
| Unique ID | Version |
| CB1 | 2.0 |
| CB2 | 1.0 |
| CB4 | 1.0 |

In the case that the new content is associated with a new container, the information shown in the bottom row of Table 6 below would be added to metadata 140. In this particular example, which is in the context of a Microsoft® Office™ environment, the containers take the form of comments. However, the containers could alternatively be content controls, or any equivalent entity in an environment other than a Microsoft® Office™ environment.

TABLE 6

| Metadata 140 | | |
| --- | --- | --- |
| Content Block Unique ID | Container Unique ID | Version |
| CB1 | C1 | 2.0 |
| CB2 | C2 | 1.0 |
| CB4 | C5 | 1.0 |

It will be appreciated that, upon completion of the process of FIG. 4, the new content block is catalogued in the source metadata and is thus capable of being synchronised across one or more destination documents by system 100 in the manner described in connection with FIG. 2 or FIG. 3.

Figure 4A:
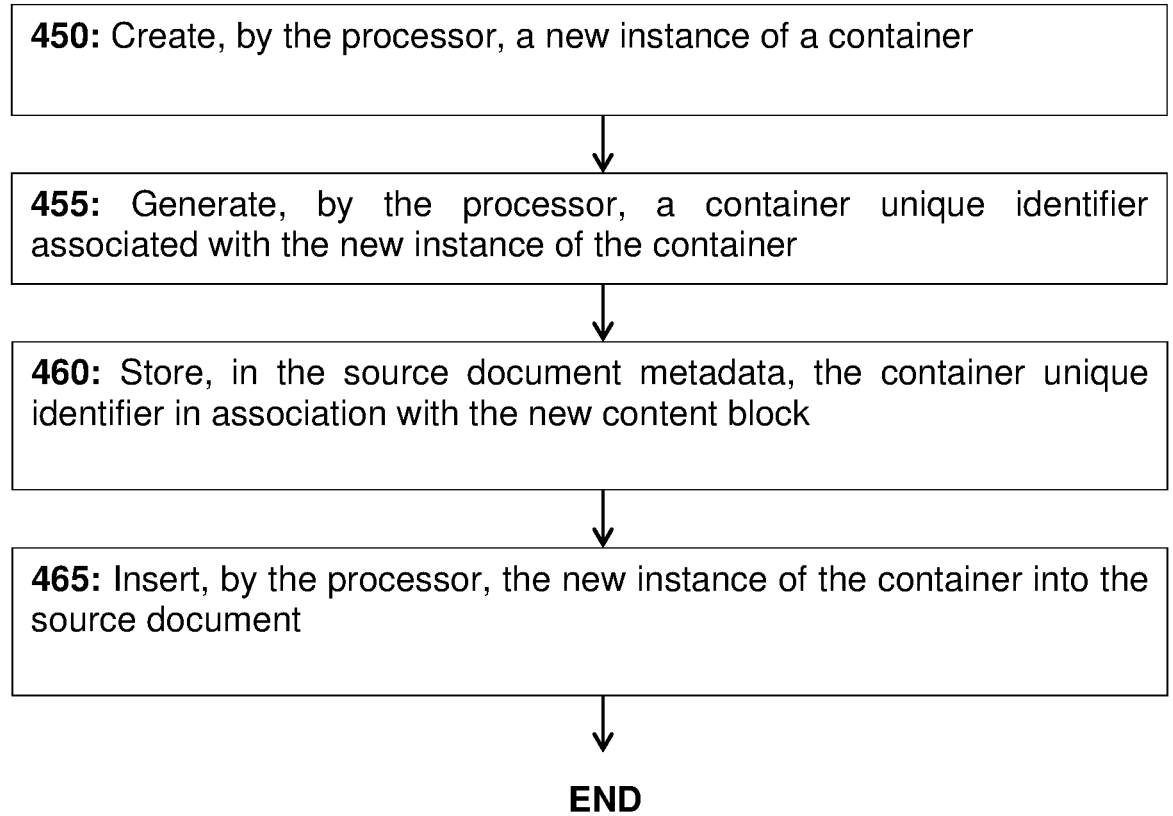
FIG. 4A shows an optional additional sub-process that can be performed as part of the process of FIG. 4.

In the case where a container is used as a delimiter, the process of FIG. 4 can optionally comprise the further steps shown in FIG. 4A. It will be appreciated that the operations shown in FIG. 4A follow step 400 of FIG. 4. These operations may be performed before, after, or substantially concurrently with steps 405 and 410.

In step 450, processor 115 creates a new instance of a container. In this example the container is a comment, but the invention is not restricted to this and other entities capable of delimiting new content such that it is separable from existing content can be used. For example, the container can be an ActiveX Control Container as known per se in the art. Other suitable containers will become apparent to a skilled person having the benefit of the present disclosure.

In step 455, processor 115 generates a container unique identifier associated with the container instance created in step 450. The container unique identifier can be a GU ID or UUID as described above.

In step 460, processor 115 stores the container unique identifier in association with the new content block in the source document metadata such as source document metadata 140. A simplified representation of the information contained in source document metadata 140 after this operation is shown in Table 6 above, where attention should be directed to the bottom row in particular.

In step 465, processor 115 inserts the container into the source document such as source document 140. Here, insertion is understood to mean adding the container into the source document such that it forms part of the source document. This may be referred to as embedding the container in the source document. A corresponding indicia, such as an element on a graphical user interface, may be presented within the document to indicate the location of the container within the document. In the case where the container is a content control, a text box, drawing canvas or combination thereof may be displayed to the user to identify the location of the container. In the case where the container is a comment, the region of the document encompassed by the comment may be displayed in a colour different from the background colour of the document so as to indicate the extent of the comment to the user.

Figure 4B:
FIG. 4B shows a process for extracting content blocks from a source document and storing a copy of the content blocks in a content database that is external from the source document according to a fourth embodiment.

FIG. 4B shows a process for extracting content blocks from a source document and storing a copy of the content blocks in a content database that is external from the source document according to a fourth embodiment. System 100 of FIG. 1 is capable of implementing the process of FIG. 4B.

In step 470, processor 115 initiates a scan of a source document to identify one or more content blocks for copying to the content database. The scan may be initiated manually in response to user input, or it may be initiated automatically based on one or more rules, e.g. the time elapsed since a previous scan exceeding a threshold value, detection of completion of editing of a content block, detection of the insertion or modification of a container within the source document, detection of a change in parameter, such as a word count, associated with a particular content block or container exceeding a threshold value, and the like.

In step 475, processor 115 copies the content of each content block identified in step 470 to a content database that is external from the source document. It will be appreciated that creation of a copy of the content does not modify the source document itself.

Here, 'external' means that the content database is separate from the source document. For example, the content database may reside within storage medium 105, but in a region of memory that is separate from the memory region where the source document resides. The content database may be, for example, a SQL database or a SharePoint® List. The content database may comprise more than one component, such as both a SQL database and a SharePoint® List. Access to the content database preferably does not require creation of an instance of an application that is associated with the source document.

Processor 115 uses the delimiters associated with each content block to identify the content that is to be copied to the content database. For example, in the case that a comment container is used, the text that is located between the extents of the comment is identified as the content block content and copied to the content database.

Optionally, in addition to the content itself, a content block unique identifier and/or a container unique identifier associated with the content block can also be stored in content database, in association with the content. A version identifier associated with the content block may also be stored in the content database. Additionally or alternatively, an identification of the source document from which the content was copied can be stored in the content database in association with the content. The identification could be, for example, a title or filename of the source document. A time of extraction may also be stored in content database, indicating the time at which the content was copied from the source document. Any other information deemed to be of utility can additionally or alternatively be stored in the content database in association with the content.

It will be appreciated that, in embodiments where the content database is present, it is not necessary to obtain content of content blocks directly from their respective source documents. Instead, the content can be extracted from the content database. This can advantageously remove the processing overhead associated with opening or otherwise viewing a source document using its associated application to obtain content, as may be required, for example, during an update operation as described in connection with FIG. 2. Additionally, use of the content database also avoids locking the source document whilst content is obtained, enabling source document editing to occur simultaneously with the update operation of FIG. 2.

Multiple instances of the process of FIG. 4B can be executed substantially concurrently, with each instance having an associated source document or set of source documents that it is responsible for monitoring.

Figure 5:
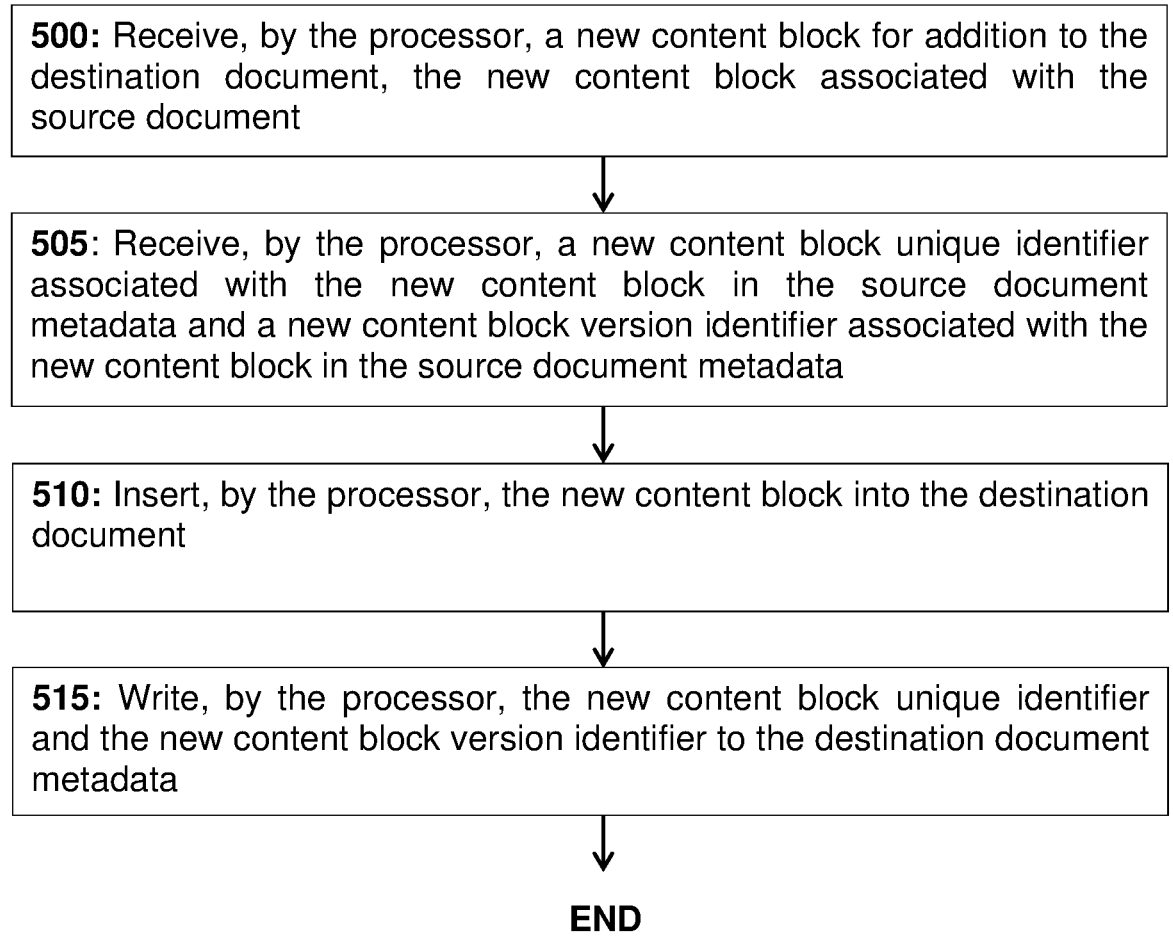
FIG. 5 shows a process for adding a new content block to a destination document according to a fifth embodiment, which process is suitable for use in combination with either the process of FIG. 2 or the process of FIG. 3.

FIG. 5 shows a process for adding a new content block to a destination document according to the fifth embodiment. System 100 of FIG. 1 is capable of implementing the process of FIG. 5.

In step 500, processor 115 receives a new content block for addition to a destination document such as destination document 135, where the new content block is associated with a source document such as source document 130.

A new content block may be received by processor 115 following an operation including but not limited to: saving the destination document, editing the destination document, detection of a paste operation having the destination document as a target, insertion of a new container into the destination document, and the like. In a preferred embodiment, a custom clipboard application is used to facilitate user-friendly insertion of a new content block. This is described in more detail below.

In step 505, processor 115 receives a new content block unique identifier associated with the new content block in the source document metadata and a new content block version identifier associated with the new content block in the source document metadata. Processor 115 may receive the unique identifiers as part of an Application Programming Interface (API) call, as are known in the art per se. Processor 115 may parse the source metadata to retrieve the unique identifiers. Other mechanisms for providing the unique identifiers to processor 115 will be apparent to a skilled person having the benefit of the present disclosure.

In step 510, processor 115 inserts the new content block into the destination document. The new content block may be inserted within a container as described later in connection with FIG. 5A. The content associated with the new content block can be retrieved directly from the respective source document, or it can be retrieved from a content database of the type described above in connection with FIG. 4B. Techniques for retrieving data from a database are known per se and so are not discussed in detail here.

In step 515, processor 115 writes the new content block unique identifier and the new content block version identifier to the destination document metadata. It will be appreciated that the result of this process is that the destination document metadata holds a record of the content block and the content block version identifier, which information can be used in an update operation according to FIG. 2 or FIG. 3.

Figure 5A:
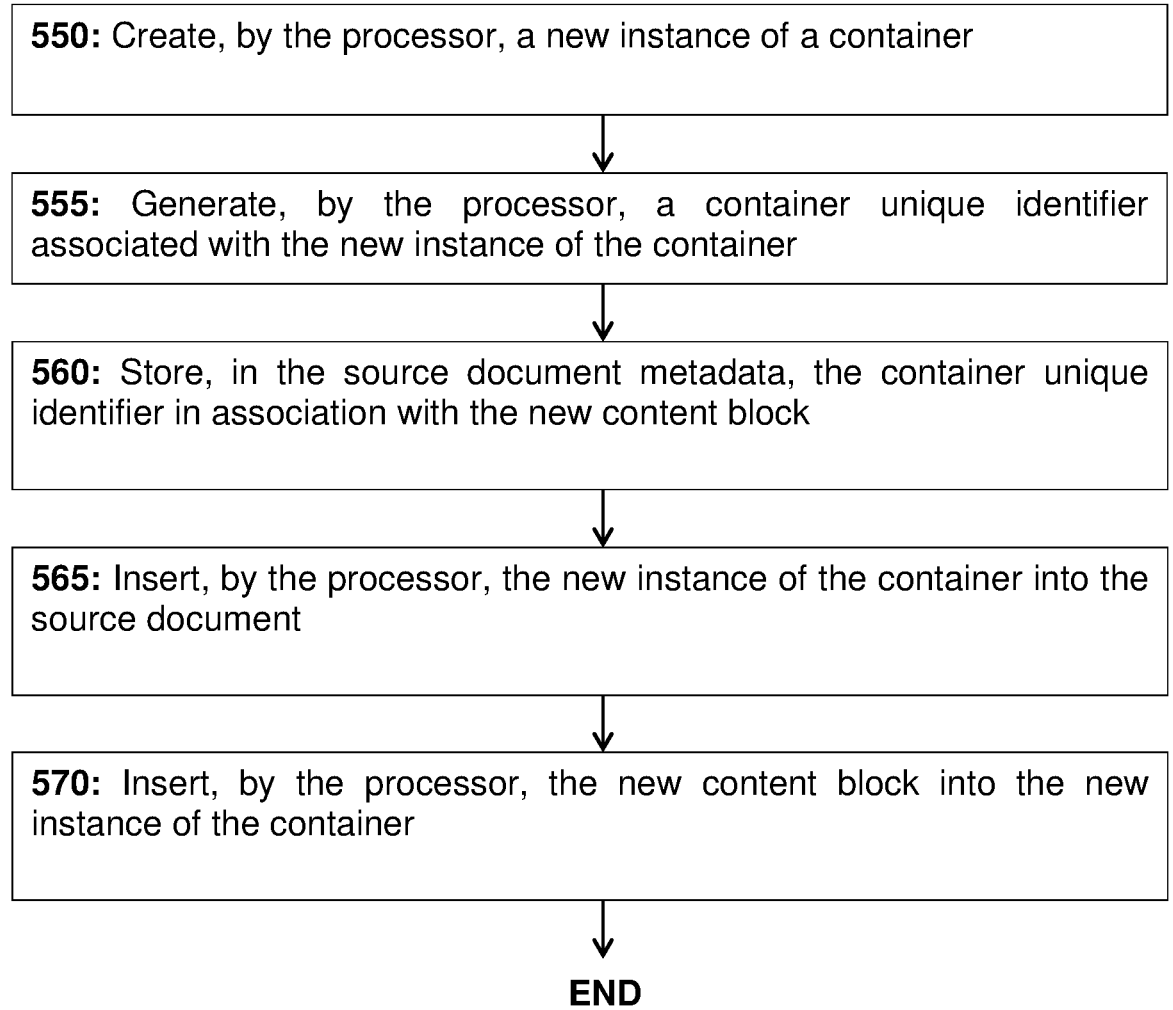
FIG. 5A shows an optional additional sub-process that can be performed as part of the process of FIG. 5.

In the case where a container is used as a delimiter, the process of FIG. 5 can optionally comprise the further steps shown in FIG. 5A. It will be appreciated that the operations shown in FIG. 5A follow step 500 of FIG. 5. These operations may be performed before, after, or substantially concurrently with steps 505, 510 and 515.

In step 455, processor 115 creates a new instance of a container. In this example the container is a content control, but the invention is not restricted to this and other entities capable of delimiting new content such that it is separable from existing content can be used. For example, the container can be a Microsoft® Office™ comment or an ActiveX Control Container as known per se in the art. Other suitable containers will become apparent to a skilled person having the benefit of the present disclosure.

In step 555, processor 115 generates a container unique identifier associated with the container instance created in step 550. The container unique identifier can be a GU ID or UUID as described above.

In step 560, processor 115 stores the container unique identifier in association with the new content block in the destination document metadata such as destination document metadata 145. A simplified representation of the information contained in destination document metadata 145 after this operation is shown in Table 7 directly below, where attention should be directed to the bottom row in particular. In this example, a second copy of content block CB1 has been inserted into a new container C6 in destination document 135.

TABLE 7

Metadata 145

| Content Block Unique ID | Container Unique ID | Version |
|---|---|---|
| CB1 | C3 | 2.0 |
| CB3 | C4 | 1.0 |
| CB1 | C6 | 2.0 |

In step 565, processor 115 inserts the container into the destination document such as destination document 140. Here, insertion is understood to mean adding the container into the destination document such that it forms part of the destination document as described above in connection with step 465 of FIG. 4A.

In step 570, processor 115 inserts the new content block into the new instance of the container. Preferably the insertion is discernible to the user in some way such that it is clear to the user that the new content block is associated with the new instance of the container. This may be achieved, for example, by representing the new content block as text and/or one or more images and/or other media objects within a frame that represents the new instance of the container on a graphical user interface. Many suitable representations are conceivable and a skilled person having the benefit of the present disclosure will be able to select a suitable representation according to the specifics of a given situation.

The content associated with the new content block can be retrieved directly from the respective source document, or it can be retrieved from a content database of the type described above in connection with FIG. 4B.

As touched upon earlier, in a preferred embodiment a custom clipboard application is used as a particularly user-friendly manner of inserting a new content block into a destination document. The custom clipboard application comprises a graphical user interface (GUI) component, e.g. a user form of a Microsoft® Office™ Add-In, and supporting programming code.

The custom clipboard GUI component is configured to display one or more available content blocks, which one or more available content blocks have been previously added to the custom clipboard from respective source document(s). The user is able to interact with the custom clipboard GUI component, e.g. using a cursor or touchscreen, to select one or more content blocks for insertion into the destination document.

Upon receipt of user input at the custom clipboard GUI component that indicates that a content block is to be inserted, processor 115 identifies the content block unique identifier associated with the content block and retrieves the content that is associated with this content block unique identifier.

In a preferred embodiment, retrieval comprises processor 115 performing a lookup in a content database of the type described in connection with FIG. 4B to retrieve content associated with the content block unique identifier. Alternatively, the metadata of associated with one or more source documents may be interrogated to identify the source document that holds the content, such that processor 115 can open or otherwise access the source document to obtain the content.

After retrieval of the content, processor 115 inserts the content into the destination document, perhaps as a new content block created as described above in connection with FIG. 5.

Addition of a content block to the custom clipboard can be performed as follows. Processor 115 receives a command to add content to the custom clipboard. The command identifies a content block unique identifier corresponding to the content block that is to be added to the custom clipboard. In response to receipt of this command, processor 115 adds a user-intelligible representation of the content of the content block corresponding to the content block unique identifier to the custom clipboard GUI component. The user-intelligible representation can be any suitable representation, such as the content in full, a summary of the content such as a first sentence of the content or a portion of an image, and the like. Optionally, additional information such as the name, title etc. of the source document that the content block is associated with may also be displayed by the custom clipboard GUI component. The user-intelligible representation of the content is stored in association with the content block unique identifier to enable processor 115 to link a given user-intelligible representation with the content block.

It is contemplated that the custom clipboard may be configured to carry out the process of FIG. 2 or FIG. 3 such that the custom clipboard GUI component can indicate when an update to a particular content block is available. It will be understood that in this scenario in step 200 of FIG. 2, or equivalently step 300 of FIG. 3, processor 115 receives a content block unique identifier that corresponds to a content block that is currently held in the custom clipboard.

The custom clipboard application is preferably configured to perform a check for updates to content that it holds periodically and/or in response to user input requesting an update.

Numerous modifications, adaptations and variations to the embodiments described herein will become apparent to a person skilled in the art having the benefit of the present disclosure, and such modifications, adaptations and variations that result in additional embodiments of the present invention are also within the scope of the accompanying claims.

The invention claimed is:

1. A computer-implemented method for updating a destination content block associated with a destination document based on a source content block associated with a source document, the source content block being one of a plurality of content blocks associated with the source document, each of the plurality of content blocks being a subset of a total content of the source document, and the destination content block being a subset of a total content of the destination document, the source document having associated source document metadata and the destination document having associated destination document metadata, the destination document metadata including at least a content block unique identifier associated with the destination content block and a destination content block version identifier associated with the destination content block, the source document metadata and the destination document metadata being stored in a storage medium as a suitable file format, the method comprising:
   a) receiving, by the processor, the content block unique identifier and the destination content block version identifier, the content block unique identifier being generated based on a current system time when the content block unique identifier is created;
   b) searching for the received content block unique identifier by a processor configured to identify content block unique identifiers in the source document metadata in the storage medium;
   c) identifying, with the processor, the content block unique identifier in the source document metadata, and comparing, by the processor, the destination content block version identifier to a source content block version identifier that is associated with the content block unique identifier in the source document metadata; and
   d) determining, based on the comparing that the source content block version identifier is more recent than the destination content block version identifier, and performing, by the processor, a further action comprising:
      outputting, to a graphical user interface displayed on a display that is communicatively coupled to the processor, an indication that a newer version of the destination content block is available; and receiving user input indicating that an update operation is to be performed; and, responsive to the user input, performing the update operation by overwriting the destination content block with the source content block; or
      performing an update operation by overwriting the destination content block with the source content block.

2. The computer-implemented method of claim 1, wherein the further action additionally comprises amending, by the processor, the destination document metadata to set the destination content block version identifier equal to the source content block version identifier.

3. The computer-implemented method of claim 1, further comprising:
   repeating steps a) to d) for each of a plurality of destination content blocks associated with the destination document.

4. The computer-implemented method of claim 1, further comprising:
   receiving, by the processor, a new content block for addition to the source document;
   generating, by the processor, a new content block unique identifier and a new content block version identifier; and
   writing, by the processor, the new content block unique identifier and the new content block version identifier to the source document metadata in association with the new content block.

5. The computer-implemented method of claim 4, further comprising:
   creating, by the processor, a new instance of a container, wherein the container includes a plurality of delimiters that identify limits of the new content block;
   generating, by the processor, a container unique identifier associated with the new instance of the container;
   storing, in the source document metadata, the container unique identifier in association with the new content block; and
   inserting, by the processor, the new instance of the container into the source document and using the plurality of delimiters to identify the content to be inserted into the source document.

6. The computer-implemented method of claim 5, wherein the container is one of a content control and a comment.

7. The computer-implemented method of claim 1, wherein the destination content block is displayed in a destination container that is stored in the destination document, wherein the destination document metadata further includes a destination container unique identifier that uniquely identifies the destination container, and wherein the destination container unique identifier is stored in association with the content block unique identifier in the destination document metadata, wherein the destination container includes a plurality of delimiters that identify limits of the destination content block.

8. The computer-implemented method of claim 1, further comprising:
   receiving, by the processor, a new content block for addition to the destination document, the new content block associated with the source document;
   receiving, by the processor, a new content block unique identifier associated with the new content block in the source document metadata and a new content block version identifier associated with the new content block in the source document metadata;
   inserting, by the processor, the new content block into the destination document; and
   writing, by the processor, the new content block unique identifier and the new content block version identifier to the destination document metadata.

9. The computer-implemented method of claim 8, wherein inserting, by the processor, the new content block into the destination document further comprises:
creating, by the processor, a new instance of a container, wherein the container includes a plurality of delimiters that identify limits of the new content block;
generating, by the processor, a container unique identifier associated with the new instance of the container
storing, in the destination document metadata, the container unique identifier in association with the new content block;
inserting, by the processor, the new instance of the container into the destination document; and
inserting, by the processor, the new content block into the new instance of the container using the plurality of delimiters to identify the content to be inserted into the container.

10. The computer-implemented method of claim 1, wherein performing an update operation by overwriting the destination content block with the source content block comprises:
retrieving, by the processor, content associated with the source content block from a content database; and
inserting, by the processor, the retrieved content into the destination document in association with the destination content block.

11. The computer-implemented method of claim 1, wherein the destination content block comprises any one or more of: text; one or more objects; one or more images; one or more video files; and one or more audio files.

12. The method of claim 1, wherein the content block unique identifier is received in step a) from a custom clipboard application and wherein the content associated with the source content block is stored in a content database.

13. A data processing system, the system including:
a processor, and
a non-transitory computer-readable storage medium having instructions stored thereon that, when executed by the processor, cause the processor to carry out the method of claim 1.

14. A non-transitory computer-readable storage medium having instructions stored thereon that, when executed by a processor, cause the processor to perform the method of claim 1.

* * * * *